(12) United States Patent
Charania et al.

(10) Patent No.: US 8,473,978 B2
(45) Date of Patent: Jun. 25, 2013

(54) CHANNEL NAVIGATION

(75) Inventors: Aamer Charania, Flower Mound, TX (US); Yuriy Bolyukh, Trophy Club, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 113 days.

(21) Appl. No.: 13/033,853

(22) Filed: Feb. 24, 2011

(65) Prior Publication Data
US 2012/0222066 A1 Aug. 30, 2012

(51) Int. Cl.
  *H04N 7/025* (2006.01)
  *H04H 60/33* (2008.01)
  *H04N 5/445* (2011.01)
(52) U.S. Cl.
  USPC .............................. 725/34; 725/10; 725/52
(58) Field of Classification Search
  None
  See application file for complete search history.

(56) References Cited

U.S. PATENT DOCUMENTS

| | | | |
|---|---|---|---|
| 5,410,367 A * | 4/1995 | Zahavi et al. | 725/58 |
| 7,778,519 B2 * | 8/2010 | Harville | 386/230 |
| 8,209,713 B1 * | 6/2012 | Lai et al. | 725/10 |
| 2005/0240967 A1 * | 10/2005 | Anderson et al. | 725/52 |
| 2008/0062336 A1 * | 3/2008 | Dooms | 348/734 |
| 2008/0066111 A1 * | 3/2008 | Ellis et al. | 725/57 |
| 2011/0243533 A1 * | 10/2011 | Stern et al. | 386/278 |

* cited by examiner

*Primary Examiner* — Chris Parry
*Assistant Examiner* — Oschta Montoya

(57) ABSTRACT

Systems and methods may include providing, to a user device, first content corresponding to a first channel of a plurality of channels; receiving, from the user device or a device associated with the user device, selection of a second channel, of the plurality of channels, when advertising content is present in the first content; providing, to the user device and responsive to the selection, second content corresponding to the second channel; identifying a conclusion of the advertising content; and generating a notification indicative of the conclusion of the advertising content.

18 Claims, 5 Drawing Sheets a different device, or some combination of devices, according to other embodiments.
CHANNEL NAVIGATION

BACKGROUND

Service and content providers offer subscribers various network services, such as television, data, and telecommunications. Subscribers to such services have access to an ever-growing amount and variety of content, services, and systems, such as television content, wireless communications, widgets, applications, interactive gaming, Internet resources, etc. Subscribers purchase or subscribe to select television content or services available from, for example, television service providers that deliver various types of television programming content, such as live and/or recorded broadcast television and/or non-broadcast television (e.g., cable, satellite, etc.) etc., using a customer-premises distribution device, such as a content interface device (e.g., a set-top box (STB)). Typically, advertising content is interspersed in television programming content.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to devices, methods, and systems for facilitating a viewer's selection of available television programming content. In some implementations, a content interface device (e.g., STB), a display device (e.g., a television), or an associated device may obtain and process information generally relating to television programming content and, particularly, to breaks in the television programming content. The information may include, for example, various details relating to placement and timing of advertising content in intervals of television programming content. In some instances, the information may be in the form of metadata corresponding to the television programming content.

Once obtained, the television programming content information may be used to perform a number of operations related to channel navigation, for example. In some implementations, a viewer who has navigated away from a television channel during a commercial break, may be notified that the commercial break is about to end and/or has ended, and that the television programming content is about to resume and/or has resumed. In some implementations, a viewer who has navigated away from a television channel during a commercial break, may be automatically returned to the television channel when the commercial break is about to end and/or has ended, and the television programming content is about to resume and/or has resumed. In other implementations, the information may be used to offer selective channel surfing, in which channels that are currently in a commercial break are automatically skipped during channel surfing.

The term, content, is intended to be broadly interpreted herein to include, for example, visual data and/or audio data, such as television programming content including, for example, movies, sports, news, video-on-demand content, programming guides, weather information, financial information, traffic information, Internet-based content, etc. The term, advertising content, is intended to be broadly interpreted herein to include, for example, content such as revenue-generating commercials, sponsored and/or unsponsored promotional advertisements, public service announcements, alerts, notifications, bulletins, or other scheduled and/or unscheduled breaks in television programming content. Content may be provided in various formats, such as, for example, standard definition, high-definition, 3-D, etc.

Figure 1:
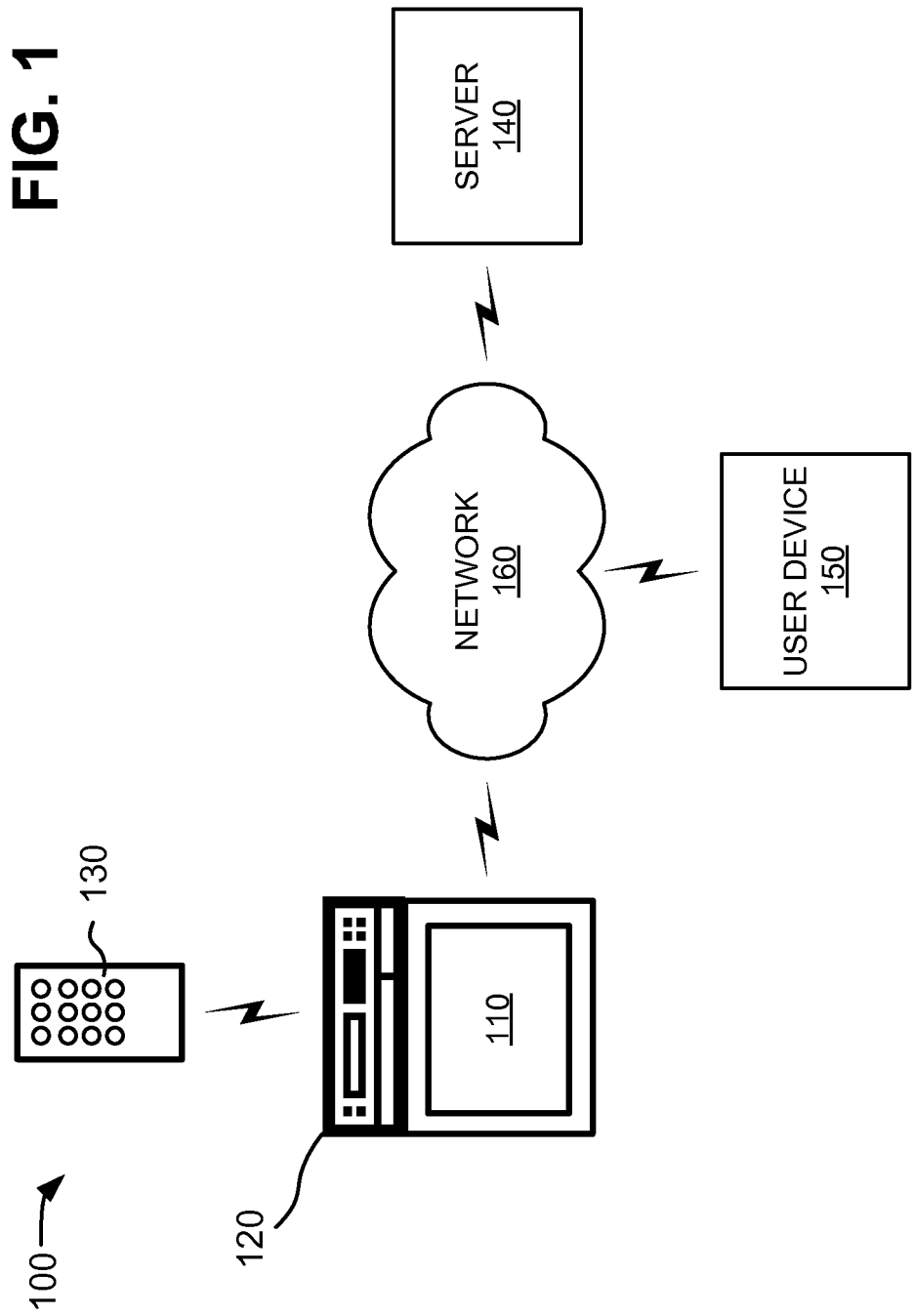
FIG. 1 depicts a diagram of an exemplary environment in which systems and methods described herein may be implemented.

FIG. 1 is a diagram of an exemplary environment 100 in which systems and methods described herein may be implemented. As illustrated, network 100 may include a television (TV) 110, a set top box (STB) 120, a remote control 130, a server 140, and a user device 150 interconnected by a network 160, via wired and/or wireless connections, for example, cable, fiber optic, and/or wireless. The number of devices and networks, and configuration in environment 100 is exemplary and provided for simplicity. In practice, environment 100 may include additional devices, fewer devices, different devices, and/or differently arranged devices, than those illustrated in FIG. 1. Additionally, or alternatively, in practice, environment 100 may include additional networks and/or differently arranged networks, than those illustrated in FIG. 1. Also, one or more functions and/or processes described as being performed by a particular device may be performed by TV 110 may include a device configured to present television content provided via STB 120, and/or content provided by other devices (e.g., a digital video disk (DVD) player, a video camera, a home media player, etc.) connected to TV 110. According to exemplary embodiments, TV 110 may be a television and/or other types of devices, for example, a monitor, a mobile device having a display (e.g., a cell phone or personal digital assistant), a laptop computer, a gaming console, a music device, etc. According to an exemplary embodiment, TV 110 and STB 120 may be separate devices, as illustrated in FIG. 1. According to other embodiments, TV 110 may include STB 120 or include some of the functionalities associated with STB 120. According to still other embodiments, TV 110 may include STB 120, and/or remote control 130.

STB 120 may include a device that communicates with server 140 to provide television services and/or content to TV 110 or another device (e.g., user device 150). STB 120 may allow a user to select the television content provided to TV 110 based on a signal generated by and received from remote control 130. In one exemplary implementation, features of STB 120 may be incorporated directly within TV 110. According to an exemplary embodiment, STB 120 may include a client, a thin client, a descrambler, a converter box, a receiver, a tuner, a digibox, an optical termination point (OTP), an optical network terminal (ONT), a server device, a pedestal, or some other type of customer premises equipment. According to an exemplary embodiment, STB 120 may also include a digital video recorder (DVR) and/or a hard drive or other storage device.

Remote control 130 may include a device that communicates with TV 110 and/or STB 120 (and/or other devices associated with TV 110 and/or STB 120) to allow a customer to control television content provided to TV 110 using, for example, a specified channel entry, channel up/down scrolling, channel scanning, a "previous channel" or "channel return" entry, etc. Remote control 130 may include one or multiple input mechanisms (e.g., buttons, a display, a keypad, a touchpad, a microphone, etc.) to receive user input to, for example, select a television channel for viewing. According to an exemplary embodiment, remote control 130 may correspond to a remote control device, a tablet device, a mobile communication device, or some other type of user device. According to other embodiments, remote control 130 may include TV 110 and/or STB 120 and/or include one or more of the functionalities associated with STB 120.

Server 140 may include one or more server entities, or other types of computation or communication devices, that gather, process, search, and/or provide information in a manner described herein. In one implementation, server 140 may include a server (e.g., a computer system or an application), a cable head-end, or a broadcaster capable of providing media content (e.g., TV programming, movies, on-demand services, live television, news feeds, blog feeds, etc.), advertisements, instructions, codes, encryption keys, and/or other information associated with products and/or services, etc., to STB 120. In some implementations, server 140 may be configured to receive information from STB 120, TV 110, and/or user device 150 in the manner described below.

User device 150 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop or notebook computer, a personal computer, an ultra mobile personal computer (UMPC), a netbook, or other types of computation or communication devices, threads or processes running on such devices, and/or objects executable by such devices. In one implementation, user device 150 may include any device (e.g., an Internet Protocol (IP)-based device) that is capable of accessing server 140 via network 160. In other implementations, user device 150 may be configured to interact with STB 120 and/or TV 110, via a local network other than network 160 (e.g., a home wired or wireless network).

Network 160 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks.

Figure 2:
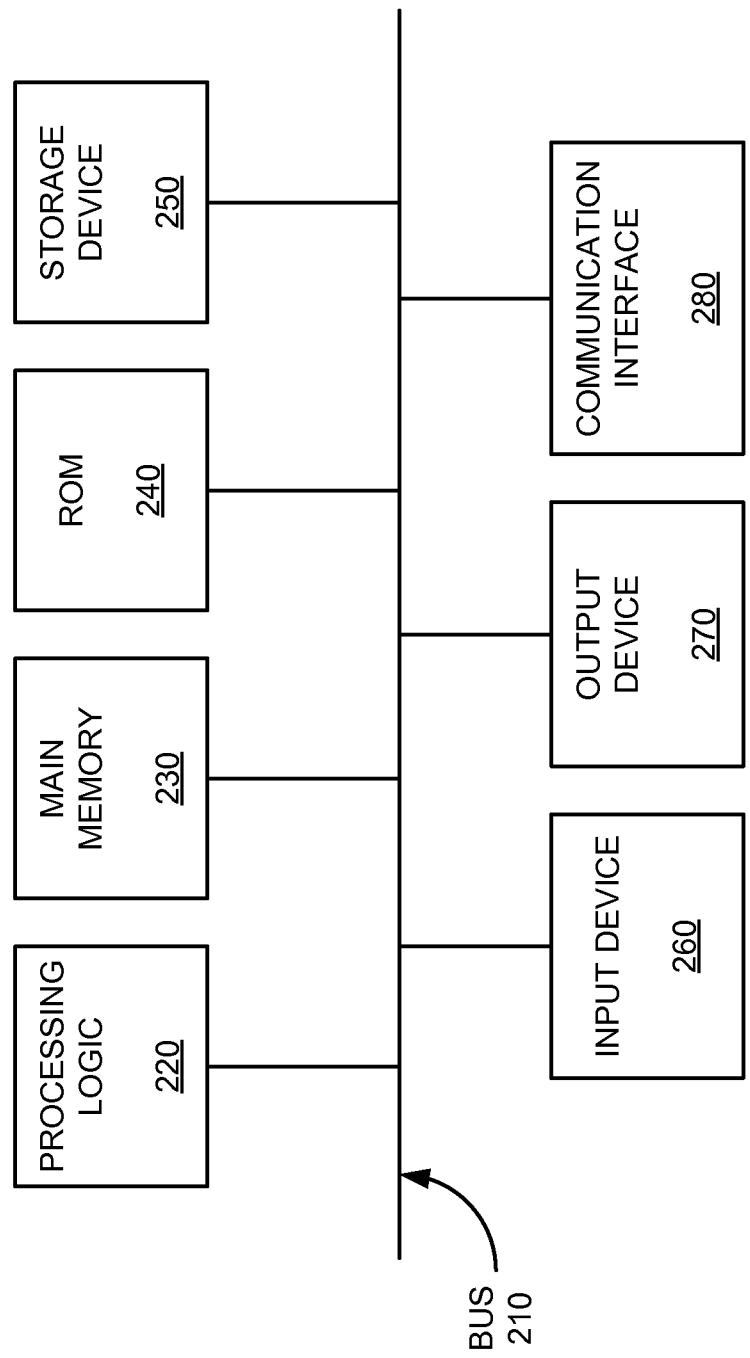
FIG. 2 illustrates exemplary components of one or more devices depicted in FIG. 1.

FIG. 2 is an exemplary diagram of a device 200 that may correspond to any of STB 120, server 140, and/or user device 150. As illustrated, device 200 may include a bus 210, processing logic 220, a main memory 230, a read-only memory (ROM) 240, a storage device 250, an input device 260, an output device 270, and a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, remote control 130, etc. Output device 270 may include a mechanism that outputs information to the operator, including a display, a printer, a speaker, etc. Communication interface 280 may include a transceiver that enables device 200 to communicate with other devices and/or systems. For example, communication interface 280 may include mechanisms for communicating with another device or system via a network, such as network 160.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware devices, circuitry, and/or software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
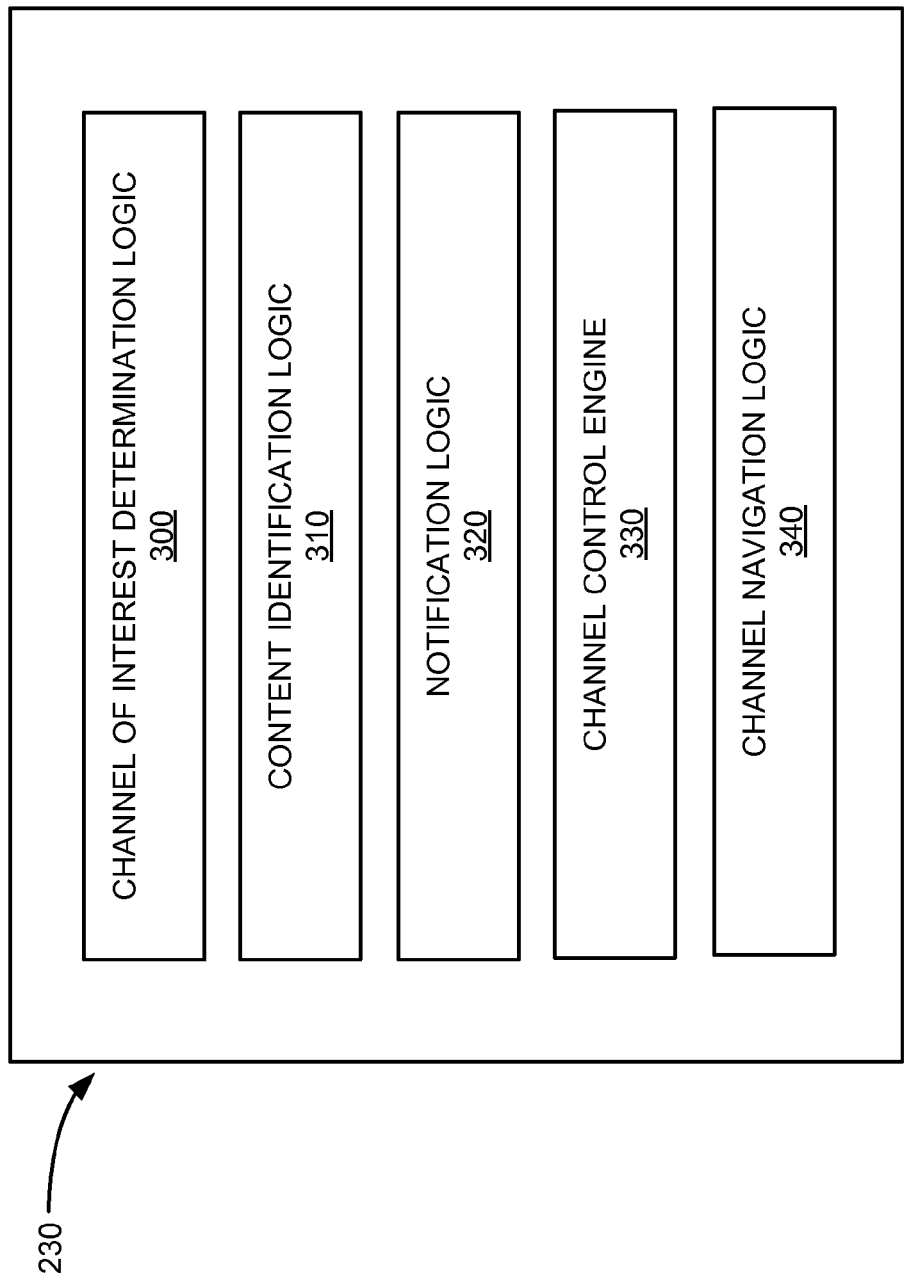
FIG. 3 is an exemplary functional block diagram of components implemented in one or more devices depicted in FIG. 1.

FIG. 3 is an exemplary functional block diagram of components implemented in STB 120 and/or television 110 of FIG. 1. In an exemplary implementation, all or some of the components illustrated in FIG. 3 may be stored in memory 230. For example, referring to FIG. 3, memory 230 may include channel of interest (CoI) determination logic 300, content identification logic 310, notification logic 320, control engine 330, and channel navigation logic 340. In addition, various logic components illustrated in FIG. 3 may be implemented by processing logic 220 executing one or more programs stored in memory 230.

CoI determination logic 300 may include logic for determining a CoI, among a plurality of channels carrying television programming content. In one implementation, CoI determination logic 300 may be configured to identify a CoI from user input received in a channel navigation assistant mode. For example, remote control 130 may include an assigned button/key for a user to identify a current television channel as a CoI. In another implementation, CoI determination logic 300 may be configured to identify a current television channel as a CoI based on amount of time that TV 110, for example, is tuned to the current television channel. In other implementations, additional parameters are used in determining the CoI, such as detecting that the current television channel is switched during a commercial break (e.g., indicative of channel surfing). Based on the identification of a CoI in this manner without receiving express user input, CoI determination logic 300 may be configured to initiate the programming content assistant mode.

Content identification logic 310 may include logic for receiving information corresponding to television programming content carried on a plurality of television channels. The scheduling information may be provided independent of the television programming content. Alternatively, the television programming content may include the scheduling and content identification logic 310 may extract the scheduling information. For example, content identification logic 310 may be configured to receive a program guide or schedule for programming content corresponding to a number of television channels accessible using STB 120, for example, provided by server 140. Exemplary scheduling information may include at least static information identifying predetermined intervals (e.g., times) in the television programming content corresponding to commercial breaks or other station breaks. For example, identifiers associated with a content stream may point to beginning and ending times, and thus run times, for advertising content provided with the television programming content and/or where advertising content is to be inserted or provided, for example, by server 140.

In some implementations, scheduling information may include at least dynamic information corresponding to beginning and ending times in a signal or stream carrying the television programming content indicating where advertising content is provided or to be inserted, for example, by server 140. Content identification logic 310 may include logic to monitor output from one or more tuners (having blocked transmission to TV 110) and determine, at any given time and for each channel, whether a break in programming is occurring and/or has concluded. Consistent with implementations described herein, content identification logic 310 may, in the channel navigation assistant mode (e.g., activated by CoI determination logic 300), identify the scheduling information for the CoI (e.g., determined by CoI determination logic 300) and determine whether a break in programming is occurring and an amount of time remaining to the conclusion of the break.

Notification logic 320 may include logic for generating a notification based on information received from content identification logic 310. Notification logic 320 may be configured to determine, at a particular amount of time from the resumption of television of programming content on the CoI, that TV 110, for example, is not tuned to the CoI. Based on this determination, notification logic 320 may generate a notification regarding the resumption of the television programming content on the CoI.

For example, notification logic 320 may generate a graphic and/or an audible notification. Other types of notifications may be generated; for example, a vibratory notification may be generated and outputted via remote control 130. Notification logic 320 may be configured to provide the notification to one or more devices, for example, selected by the user. For example, TV 110 may present an icon representative of the amount of time remaining until resumption of the television programming content. For example, the notification may include a countdown beginning, for example, at 10 seconds or less before the scheduled conclusion of the break in the television programming content. The countdown time may be user-configurable.

In another implementation, the notification may be transmitted in the form of a signal sent to remote control 130 and rendered, for example, as a light indicator and/or a vibration. In another implementation, the notification may be transmitted in the form of a signal sent to a device associated with TV 110 and/or remote control 130, such as user device 150 and rendered audibly, for example, in a Bluetooth-enabled communication device. The type of notification(s) may be user-configurable. In some implementations, the prominence of the notification may increase as a function of how near, in time, it is until the conclusion of the break. For example, the icon may be enlarged or graphic effects applied (e.g., flashing, etc.) and/or an audible level increased.

In other implementations, notification logic 320 may be configured to generate a notification indicating that TV 110, for example, will be automatically returned to the CoI upon resumption of the television programming content (i.e., conclusion of the advertising content). Notification logic 320 may prompt the user for input in order to cancel the automatic return to the CoI.

Channel control engine 330 may include logic for performing a channel selection operation based on information received from notification logic 320. Channel control engine 330 may be configured to tune to the CoI, without input from the user, upon the resumption of the television programming content (i.e., conclusion of the break). Channel control engine 330 may be configured to cancel the automatic return operation based on user input received, for example, from remote control 130. In another implementation, channel selection logic 330 may send a signal to remote control 130, for example, to reconfigure a particular button/key (e.g., the "channel return," "back," "previous," or similar key) to correspond to a return to the CoI, regardless of the actual previously-viewed channel. In this implementation, channel control engine 330 may not automatically switch the currently tuned channel back to the CoI, but instead may allow a (single-action) user input to return to the CoI from the current channel. In other implementations, remote control 130 may include a designated button/key for returning to the CoI.

Channel navigation logic 340 may include logic to control a channel navigation operation based on the television programming content/advertising content scheduling information received from content identification logic 310. Channel navigation logic 340 may be configured to generate, from the scheduling information, a list of channels that are currently providing television programming content and a list of channels that are currently providing advertising content. Based on the lists, channel navigation logic 340 may determine the channels to be included in and the channels to be excluded from (i.e., skipped) a channel scrolling operation (e.g., arrow up/down feature on remote control 130). In this manner, when a user performs channel surfing, the channels that are currently in commercial break will automatically be skipped and the corresponding content will not be presented, for example, to TV 110. In one implementation, remote control 130 may have an assigned key/button dedicated to perform channel surfing in this manner.

It will be appreciated that the scheduling information may be indeterminate for one or more channels (e.g., airing live programming). With respect to these channels, channel navigation logic 340 and/or content identification logic 310 may be configured to determine a likelihood that the channel is currently providing advertising content using, for example, historical information to determine observable patterns. Channel navigation logic 340 may compare the associated likelihoods for each channel to a threshold value. The threshold value may be user-configurable. That is, the user may select the level of certainty associated with omitting or including channels in a prospective navigation list.

Based on the results of the comparison, channel navigation logic 340 may be configured to generate a list of channels that are likely currently providing television programming content and a list of channels that are likely currently providing advertising content. In some implementations, channel navigation logic 340 may receive user input indicating a desire to limit the list of channels, to be included in the channel surfing operation, to only the channels that are guaranteed (or essentially guaranteed) to not currently be in commercial break, while potentially excluding one or more channels that are, in fact, providing television programming content. In other instances, channel navigation logic 340 may receive user input indicating a desire to expand the list of channels, to be included in the channel surfing operation, to the channels that are likely to not currently be in commercial break, while potentially including one or more channels that are, in fact, providing advertising content. The lists may be updated to drop and/or add channels continuously or at particular intervals, which may be user-configurable.

Figure 4:
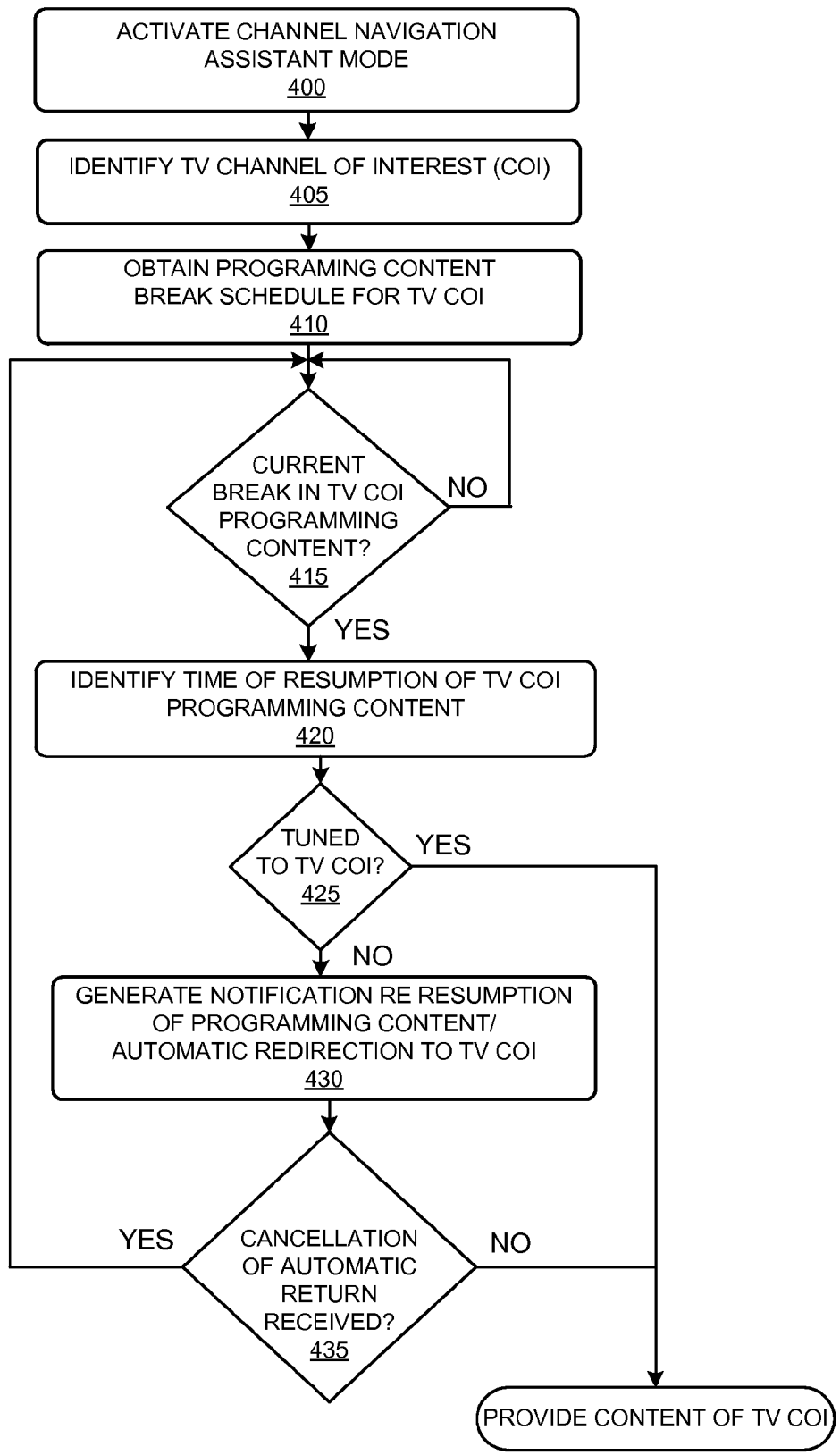
FIGS. 4 and 5 are flow charts of exemplary processes according to implementations described herein.

FIG. 4 is a flow diagram illustrating exemplary processing associated with the television channel navigation components of FIG. 3. Processing may begin with STB 120 and/or TV 110 (e.g., CoI determination logic 300) activating a channel navigation assistant mode, for example, based on user input received from remote control 130 (block 400). STB 120 and/or TV 110 (e.g., CoI determination logic 300) may identify a CoI (channel of interest) (block 405). As described above, the CoI may be the channel that is currently provided by STB 120 to TV 110 and/or a channel that the user has designated, for example, via user remote control 130.

Once the CoI has been identified, STB 120 and/or TV 110 (e.g., content identification logic 310) may obtain a television programming content schedule for the CoI (block 410). For example, the television programming content currently provided over the CoI may be a recorded program for which scheduling information indicates will have commercial breaks at designated intervals in the programming (e.g., every 10 minutes in the programming). STB 120 and/or TV 110 (e.g., content identification logic 310) may determine, based on the scheduling information, whether advertising content is currently being provided over the CoI (block 415). If so, STB 120 and/or TV 110 (e.g., content identification logic 310) may identify, based in the scheduling information, a prospective time for the resumption of the television programming content/conclusion of the break (block 420).

STB 120 and/or TV 110 (e.g., content identification logic 310 and/or notification logic 320) may determine if STB 120 is currently providing content carried over the CoI (block 425). That is, content identification logic 310 and/or notification logic 320 may determine if STB 120 and/or TV 110 is tuned to the CoI. If not, STB 120 and/or TV 110 (e.g., notification logic 320) may generate a notification regarding the time corresponding to the resumption of the television programming content/conclusion of the break (block 430). As described above, the notification may be provided, to the user, using one or more devices, for example, remote control 130 and/or user device 150. Also as described above, the notification may indicate that TV 110 will be automatically redirected to the CoI absent user input to the contrary. That is, the user may be prompted to cancel the automatic redirection to the CoI. Alternatively, the notification may activate a key/button, for example, on remote control 130, by which the user may manually redirect from the current channel to the CoI, for example, in a single action.

STB 120 and/or TV 110 (e.g., channel selection logic 320) may determine whether user input is received to either cancel the automatic redirection or to manually redirect to the CoI (block 435). STB 120 and/or TV 110 (e.g., channel selection logic 320) may, based on the user input received or, in the absence of user input, select to provide content corresponding to the CoI or the current channel, as appropriate. For example, if cancellation of the automatic redirection is received, STB 120 and/or TV 110 may remain tuned to the current channel. However, if no cancellation of the automatic redirection is received, STB 120 and/or TV 110 may switch to the CoI.

Figure 5:
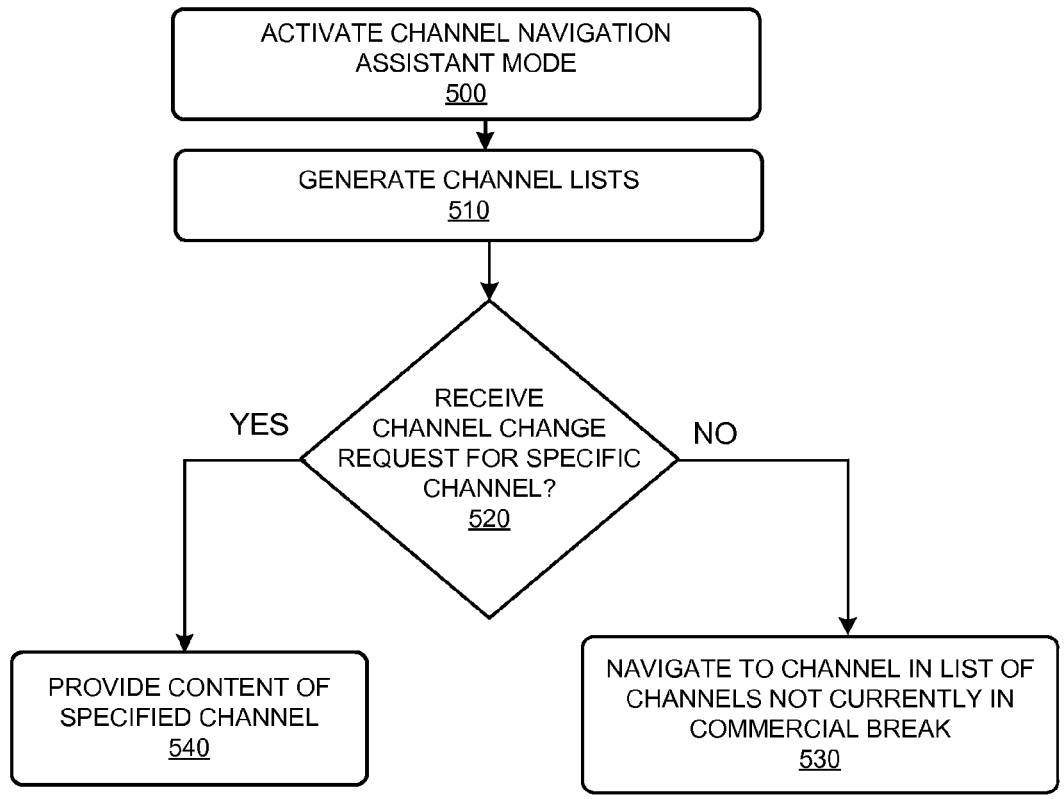

FIG. 5 is a flow diagram illustrating additional exemplary processing associated with the television channel navigation components of FIG. 3. Processing may begin with STB 120 and/or TV 110 (e.g., channel navigation logic 340) activating the channel navigation assistant mode, for example, based on user input received from remote control 130 (block 500). Once activated, channel navigation logic 340 may, based on television programming content/advertising content scheduling information received from content identification logic 310, generate a list of channels that are (or likely are) currently providing television programming content and a list of channels that are (or likely are) currently providing advertising content (block 510).

Channel navigation logic 340 may determine whether user input, to change the current channel, is indicative of a specific channel selection (e.g., a particular channel entry, a "previous channel" entry, etc.) or a non-specific channel selection (e.g., arrow up/down, a dedicated channel surfing key/button, etc.) indicative of a channel surfing operation (block 520). When channel navigation logic 340 determines that the channel surfing function is operative or that a non-specific channel input has been received, channel navigation logic 340 may navigate to the next channel in the list of channels that are (or likely are) currently providing television programming content (block 530). That is, channel navigation logic 340 may skip the next sequential channel if the next sequential channel is currently providing advertising content. When channel navigation logic 340 determines that the channel surfing function is not operative (e.g., the user has input a particular channel, for example, via remote control 130), channel control engine 330 may change the current channel to the specified channel corresponding to the user input, regardless of whether the specified channel is in the list of channels that are (or likely are) currently providing television programming content (block 540). That is, channel control engine 330 may cause STB 120 and/or TV 110 to provide content provided over the specified channel, even if it is advertising content at the current time.

Implementations described herein relate to devices, methods, and systems for facilitating channel navigation with respect to content being provided over a plurality of channels. In some implementations, an STB and/or television may include components configured to maintain information regarding channels currently carrying advertising content. The information may be used to notify a viewer and/or aid the viewer in navigating the channels.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to a STB or television performing channel navigation functions. In other implementations, features described herein may be implemented mainly in one or more devices remote from the STB or television, such as by a remote server application (such as server 140). In addition, implementations described herein may be used in scanning radio (e.g., AM, FM, satellite) stations or other media content provided over channels and/or discrete frequencies. Implementations described herein may be fee-based services offered, for example, by a service provider associated with server 140.

Further, while series of blocks have been described with respect to FIGS. 4 and 5, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising:
   identifying a first list of channels, of a plurality of channels carrying content, determined to not be presenting advertising content;
   identifying a second list of channels, of the plurality of channels, determined to be presenting advertising content;
   identifying a third list of channels, of the plurality of channels, for which a conclusive determination cannot be made with respect to whether advertising content is being presented, wherein the identifying comprises:
      determining a likelihood that respective ones of the identified channels are presenting the advertising content, and
      associating, based on the determined likelihoods, a first set of the identified third list of channels with a first likelihood threshold and a second set of the identified third list of channels with a second likelihood threshold, wherein the second likelihood threshold corresponds to a greater likelihood relative to the first likelihood threshold;
   receiving, from a user device or a device associated with the user device, input indicative of a channel navigation operation with respect to the plurality of channels;
   providing, to the user device and based on the channel navigation operation, the content corresponding to the first list of channels; and
   providing, to the user device and responsive to user input received for expanding the channel navigation operation to include one or more of the identified third list of channels, the content corresponding to at least one channel of the first set of the identified third list of channels.

2. The computer-implemented method of claim 1, further comprising:
   receiving, from the user device or the device associated with the user device, user input indicative of selection of at least one channel of the second set of the identified third list of channels, wherein the user input differs from the channel navigation operation; and
   providing, to the user device, the content corresponding to the at least one channel.

3. The computer-implemented method of claim 1, further comprising:
   providing, to the user device and prior to receiving the input indicative of a channel navigation operation, first content corresponding to a first channel of the plurality of channels;
   determining that receiving the input indicative of the channel navigation operation occurs when advertising content is present in the first content;
   identifying a conclusion of the advertising content; and
   generating a notification indicative of the conclusion of the advertising content.

4. The computer-implemented method of claim 3, further comprising:
   automatically returning, at a time corresponding to the conclusion of the advertising content, to the first channel; and
   providing, upon return to the first channel, the first content to the user device.

5. The computer-implemented method of claim 3, further comprising:
   determining that the content, corresponding to the first channel, is not being provided to the user device at a time corresponding to the conclusion of the advertising content; and
   providing the notification to at least one of the user device or another device associated with the user device.

6. The computer-implemented method of claim 5, wherein providing the notification comprises:
   providing at least one indication with an increasing prominence corresponding to a decreasing amount of time remaining until the conclusion of the advertising content.

7. A system comprising:
   a communication interface configured to receive content over a plurality of channels; and
   a processor configured to:
   identify a first list of channels, of the plurality of channels, determined to not be presenting advertising content;
   identify a second list of channels, of the plurality of channels, determined to be presenting advertising content;
   identify a third list of channels, of the plurality of channels- for which a conclusive determination cannot be made with respect to whether advertising content is being presented, including:
      determining a likelihood that respective ones of the identified third list of channels are presenting the advertising content, and
      associating, based on the determined likelihoods, a first set of the identified third list of channels with a first likelihood threshold and a second set of the identified third list of channels with a second likelihood threshold, wherein the second likelihood threshold corresponds to a greater likelihood relative to the first likelihood threshold;
   receive, from a user device or a device associated with the user device, input indicative of a channel navigation operation with respect to the plurality of channels;

provide, to the user device and based on the channel navigation operation, the content corresponding to the first list of channels; and provide, to the user device and responsive to user input received for expanding the channel navigation operation to include one or more of the identified third list of channels, the content corresponding to at least one channel of the first set of the identified third list of channels.

8. The system of claim 7, wherein the processor is further configured to:

receive, from the user device or the device associated with the user device, user input indicative of selection of at least one channel of the second set of the identified third list of channels, wherein the user input differs from the channel navigation operation; and provide, to the user device, the content corresponding to the at least one channel.

9. The system of claim 7, wherein the processor is further configured to:

provide, to the user device and prior to receiving the input indicative of a channel navigation operation, first content corresponding to a first channel of the plurality of channels;

determine that receiving the input indicative of the channel navigation operation occurs when advertising content is present in the first content;

identify a conclusion of the advertising content; and generate a notification indicative of the conclusion of the advertising content.

10. The system of claim 9, wherein the processor is further configured to:

automatically return, at a time corresponding to the conclusion of the advertising content, to the first channel; and provide, upon return to the first channel, the first content to the user device.

11. The system of claim 9, wherein the processor is further configured to:

determine that the content, corresponding to the first channel, is not being provided to the user device at a time corresponding to the conclusion of the advertising content; and provide the notification to at least one of the user device or another device associated with the user device.

12. The system of claim 11, wherein when providing the notification, the processor is further configured to:

provide at least one indication with an increasing prominence corresponding to a decreasing amount of time remaining until the conclusion of the advertising content.

13. A non-transitory computer-readable memory device storing instructions executable by at least one processor, comprising one or more instructions to:

identify a first list of channels, of a plurality of channels carrying content, determined to not be presenting advertising content;

identify a second list of channels, of the plurality of channels, determined to be presenting advertising content;

identify a third list of channels, of the plurality of channels- for which a conclusive determination cannot be made with respect to whether advertising content is being presented, including:

determining a likelihood that respective ones of the identified third list of channels are presenting the advertising content, and associating, based on the determined likelihoods, a first set of the identified third list of channels with a first likelihood threshold and a second set of the identified third list of channels with a second likelihood threshold, wherein the second likelihood threshold corresponds to a greater likelihood relative to the first likelihood threshold;

receive, from a user device or a device associated with the user device, input indicative of a channel navigation operation with respect to the plurality of channels;

provide, to the user device and based on the channel navigation operation, the content corresponding to the first list of channels; and provide, to the user device and responsive to user input received for expanding the channel navigation operation to include one or more of the identified third list of channels, the content corresponding to at least one channel of the first set of the identified third list of channels.

14. The non-transitory computer-readable memory device of claim 13, wherein the one or more instructions are further to:

receive, from the user device or the device associated with the user device, user input indicative of selection of at least one channel of the second set of the identified third list of channels, wherein the user input differs from the channel navigation operation; and provide, to the user device, the content corresponding to the at least one channel.

15. The non-transitory computer-readable memory device of claim 13, wherein the one or more instructions are further to:

provide, to the user device and prior to receiving the input indicative of a channel navigation operation, first content corresponding to a first channel of the plurality of channels;

determine that receiving the input indicative of the channel navigation operation occurs when advertising content is present in the first content;

identify a conclusion of the advertising content; and generate a notification indicative of the conclusion of the advertising content.

16. The non-transitory computer-readable memory device of claim 15, wherein the one or more instructions are further to:

automatically return, at a time corresponding to the conclusion of the advertising content, to the first channel; and provide, upon return to the first channel, the first content to the user device.

17. The non-transitory computer-readable memory device of claim 15, wherein the one or more instructions are further to:

determine that the content, corresponding to the first channel, is not being provided to the user device at a time corresponding to the conclusion of the advertising content; and provide the notification to at least one of the user device or another device associated with the user device.

18. The non-transitory computer-readable memory device of claim 17, wherein when providing the notification, the one or more instructions are further to:

provide at least one indication with an increasing prominence corresponding to a decreasing amount of time remaining until the conclusion of the advertising content.

* * * * *